United States Patent
Winkelhake et al.

(10) Patent No.: US 11,052,799 B2
(45) Date of Patent: Jul. 6, 2021

(54) LUMBAR SUPPORT FOR A SEAT

(71) Applicant: component engineering services GmbH, Gifhorn (DE)

(72) Inventors: Bernd Winkelhake, Gifhorn (DE); Daniel Arnke, Vechelde (DE)

(73) Assignee: component engineering services GmbH, Gifhorn (DE)

( * ) Notice: Subject to any disclaimer, the term of this patent is extended or adjusted under 35 U.S.C. 154(b) by 0 days.

(21) Appl. No.: 16/610,300

(22) PCT Filed: May 2, 2018

(86) PCT No.: PCT/EP2018/061141
§ 371 (c)(1),
(2) Date: Nov. 1, 2019

(87) PCT Pub. No.: WO2018/202679
PCT Pub. Date: Nov. 8, 2018

(65) Prior Publication Data
US 2020/0079260 A1    Mar. 12, 2020

(30) Foreign Application Priority Data
May 2, 2017    (DE) .................... 10 2017 109 367.2

(51) Int. Cl.
*B60N 2/66* (2006.01)
*A47C 7/46* (2006.01)

(52) U.S. Cl.
CPC ........... *B60N 2/666* (2015.04); *B60N 2/6671* (2015.04); *A47C 7/462* (2013.01)

(58) Field of Classification Search
CPC ...... B60N 2/666; B60N 2/667; B60N 2/6671; A47C 7/462
See application file for complete search history.

(56) References Cited

U.S. PATENT DOCUMENTS 5,174,526 A * 12/1992 Kanigowski ......... B60N 2/6671
244/118.5
6,227,618 B1 * 5/2001 Ligon, Sr. ................ B60N 2/66
297/284.4

(Continued)

FOREIGN PATENT DOCUMENTS

DE    102007028052 A1 *  5/2008   ............. B60N 2/643
EP        1331132 A1 *  7/2003   ............... B60N 2/66

(Continued)

OTHER PUBLICATIONS

International Search Report of the searching authority for PCT Application Serial No. PCT/EP2018/061141; Publication No. WO/2018/202679 A1; dated Jul. 6, 2018.

*Primary Examiner* — Timothy J Brindley
(74) *Attorney, Agent, or Firm* — Brian B. Shaw, Esq.; Harter Secrest & Emery LLP

(57) ABSTRACT

A lumbar support (100) for a seat (200) defining a back plane (E) comprises a support device (10) having an upper end (O) including an upper angle of inclination (α) with the back plane (E) and a lower end (U) including a lower angle of inclination (β) with the back plane (E) and forming an crown of the curvature (S) located in an adjustable position between the upper end (O) and the lower end (U). The lumbar support (100) further comprises at least one angle adjuster (20, 25) connected to the upper end (O) or the lower end (U) and adapted to vary the upper angle of inclination (α) or the lower angle of inclination (β) in order to adjust the position of the crown of the curvature (S), and an actuator (30, 35) for adjusting the angle adjuster (20, 25).

12 Claims, 5 Drawing Sheets

(56) References Cited

U.S. PATENT DOCUMENTS

Figure 1:
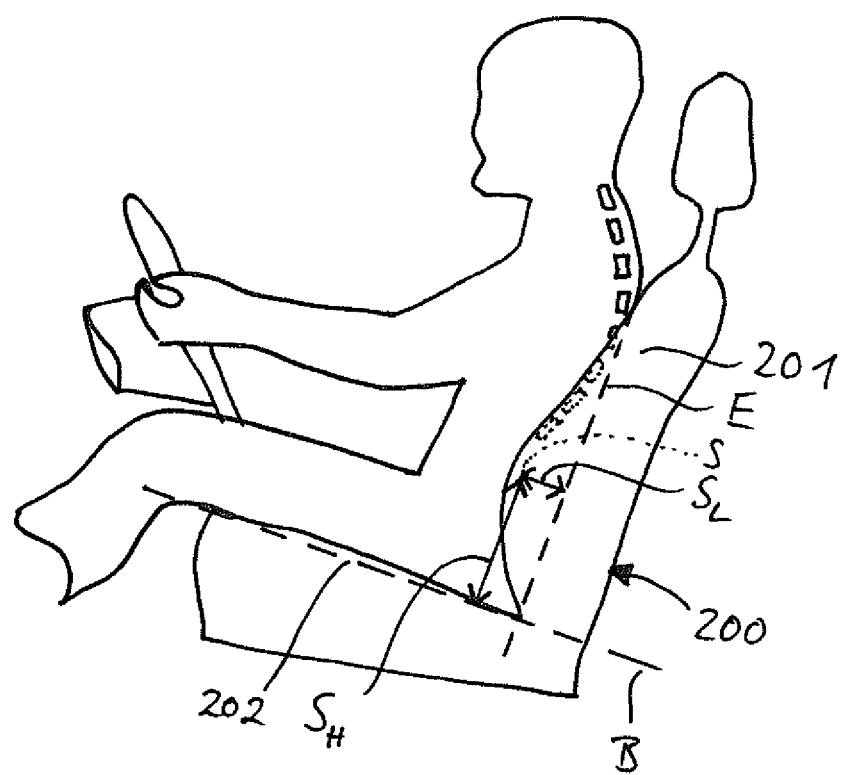

| | | | | |
|---|---|---|---|---|
| 7,905,547 B2* | 3/2011 | Lawall | ............... | B60N 2/42745 |
| | | | | 297/284.4 |
| 8,038,215 B2* | 10/2011 | Di Giusto | ............ | B60N 2/6671 |
| | | | | 297/284.1 |
| 10,315,771 B1* | 6/2019 | Rao | .................... | B64D 11/0639 |
| 10,583,757 B2* | 3/2020 | Ketels | .................... | B60N 2/643 |
| 2002/0195854 A1* | 12/2002 | Hong | .................... | B60N 2/6671 |
| | | | | 297/284.4 |
| 2003/0071501 A1 | 4/2003 | Cruz Fernandes de Pinho et al. | | |
| 2003/0085099 A1* | 5/2003 | Liu | .......................... | G05G 5/06 |
| | | | | 192/223.2 |
| 2004/0080197 A1* | 4/2004 | Kopetzky | ............ | B60N 2/6671 |
| | | | | 297/284.4 |
| 2005/0275263 A1 | 12/2005 | Norman | | |
| 2008/0185882 A1* | 8/2008 | Humer | .................. | B60N 2/6673 |
| | | | | 297/216.12 |
| 2010/0187874 A1* | 7/2010 | Matsui | ................. | B60N 2/4228 |
| | | | | 297/216.12 |
| 2010/0301650 A1* | 12/2010 | Hong | ................... | B60N 2/6671 |
| | | | | 297/284.8 |
| 2011/0062757 A1* | 3/2011 | Colja | .................... | B60N 2/666 |
| | | | | 297/284.3 |
| 2013/0341982 A1* | 12/2013 | Maierhofer | .......... | B60N 2/6673 |
| | | | | 297/284.4 |
| 2016/0325641 A1* | 11/2016 | Ohno | .................... | B60R 21/207 |
| 2018/0116406 A1* | 5/2018 | Galbreath | ................ | B60N 2/66 |

FOREIGN PATENT DOCUMENTS

| | | | | |
|---|---|---|---|---|
| WO | WO-2006019189 A1 * | 2/2006 | ............ | B60N 2/829 |
| WO | 2006133809 A1 | 12/2006 | | |
| WO | WO-2006133809 A1 * | 12/2006 | ............ | A47C 7/465 |
| WO | WO-2008004678 A1 * | 1/2008 | ............ | B60N 2/888 |
| WO | WO-2013040085 A2 * | 3/2013 | ............ | B60N 2/028 |

* cited by examiner

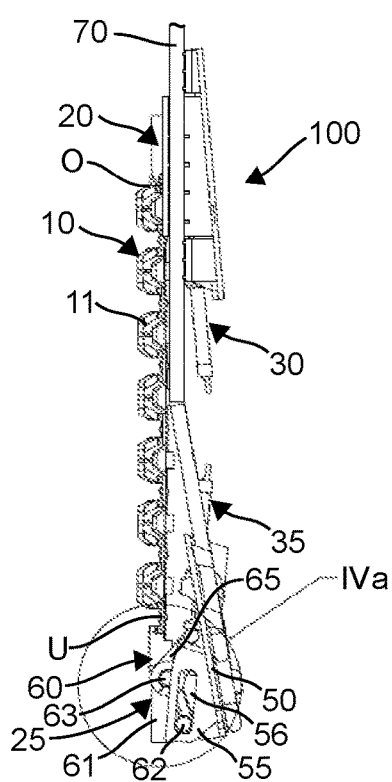
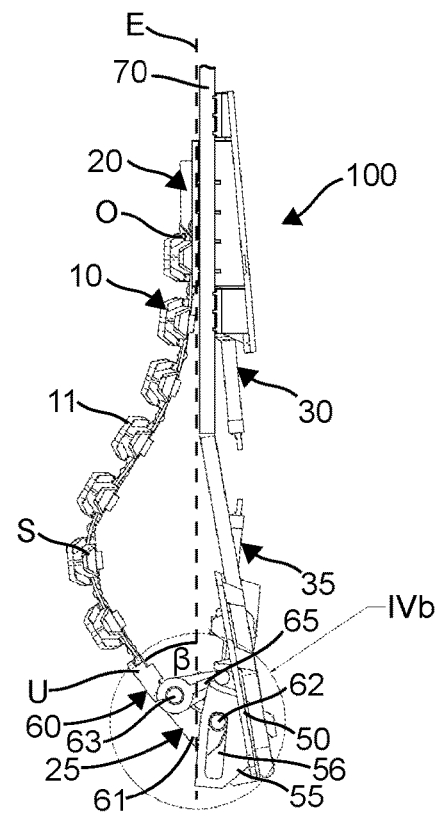
FIG. 3a                FIG. 3b
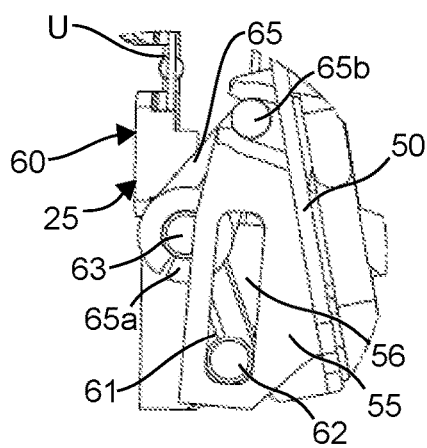
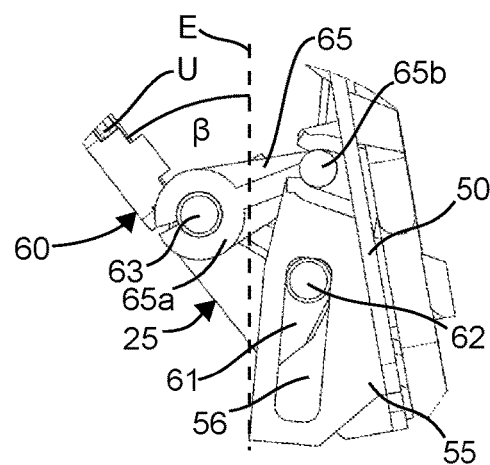
FIG. 4a                FIG. 4b

LUMBAR SUPPORT FOR A SEAT

The invention relates to a lumbar or lordosis support for a seat, in particular for a motor vehicle seat. Furthermore, the invention relates to a seat which comprises the lumbar support.

A lordosis generally describes a curvature of the spine to the front, i.e. to the belly. The spine of healthy people has a lordosis in the area of the cervical spine and one in the area of the lumbar spine. When sitting, the lumbar spine in particular is subjected to a high load. Lumbar supports serve to support the lordosis in the area of the lumbar spine. An adequate support of the lordosis in the area of the lumbar spine leads to a relief of the musculature. This enables relaxed and unstressed sitting even over longer periods of time.

Lumbar supports are usually installed in the backrests of seats behind the upholstery. The back contour of each person is individual and varies depending on the training condition, physiological and psychological condition. In addition, support of the lumbar spine is perceived differently by each person. It is therefore advantageous if the lumbar support can be adjusted with regard to these individual aspects. A distinction is made between two-way lumbar supports, in which only the curvature is adjustable, and four-way lumbar supports, in which the curvature and the height of a crown of the curvature can be adjusted.

Different concepts are known for adjusting the lumbar support. Often lumbar supports are adjusted electromechanically or pneumatically. For instance, an electromechanical four-way lumbar support requires an actuator to adjust the curvature and another actuator to adjust the height of the crown of the curvature. The actuator for the height adjustment has to cover rather large distances of up to 100 mm. Alternatively, only an actuator with a gearbox may be installed, as is disclosed in DE 10 2014 201 049 A1. With a pneumatic four-way lumbar support, one compressor fills several air cells. Several valves open and close the air cells.

AT 358 767 B reveals a flexible, elastic support whose ends can be tilted by means of hinges in order to displace a curvature of the support. The hinges are adjustable by means of a screw spindle.

A backrest for a wheelchair is revealed in US 2008/0079298 A1. The backrest is connected to a frame through which the shape of the backrest can be adjusted.

The invention is based on the task of creating a lumbar support that has short actuator travel and is continuously adjustable.

The task is solved by a lumbar support according to claim 1 and a seat according to claim 13. Advantageous embodiments of the lumbar support are the subject of claims 2 to 12.

According to the invention, the lumbar support for a seat defining a back plane comprises a support device having an upper end enclosing an upper angle of inclination with the back plane and a lower end enclosing a lower angle of inclination with the back plane and forming a crown of the curvature that is an adjustable position between the upper end and the lower end, at least one angle adjuster connected to the upper end or the lower end and adapted to vary the upper angle of inclination or the lower angle of inclination to adjust the position of the crown of the curvature, and an actuator for adjusting the angle adjuster. The angle adjuster is connected to the actuator in such a way that a movement produced by the actuator, in particular a translational movement, causes a translational and rotational adjustment of the angle adjuster to change the upper angle of inclination or the lower angle of inclination.

The crown of the curvature is the crown of the support device, i.e. the point of the support device which, when installed, is the furthest from the back plane in a longitudinal direction of the seat. The position of the crown of the curvature has a longitudinal component with respect to the back plane in a direction perpendicular to the back plane and a height component with respect to a reference plane passing through a seat surface of the seat and perpendicular to the back plane.

When the upper and/or lower angle of inclination is changed, the shape of the support device is changed so that the position of the crown of the curvature is adjusted in the height component and/or in the longitudinal component. By adjusting the position of the crown of the curvature by the angle adjuster(s), only small actuator travel is required. The lumbar support is continuously adjustable.

Advantageously, the lumbar support comprises a bearing element for the angle adjuster and a coupling having a first end and a second end, the angle adjuster having a clamping member comprising a connecting portion and a coupling point, the connecting portion being rotatably and slidably supported on the bearing element, wherein the first end of the coupling is rotatably connected to the clamping member at the coupling point and the second end of the coupling is rotatably connected to the bearing member, and wherein the actuator engages the connecting portion to cause movement of the clamping member relative to the bearing member by which the upper angle of inclination or the lower angle of inclination is changed.

When the actuator is actuated, the connecting portion of the clamping member on the bearing element is shifted. The coupling causes an additional inclination of the clamping member. The upper angle of inclination or the lower angle of inclination is changed by the inclination of the clamping member.

Advantageously, the lumbar support has an upper angle adjuster which is connected to the upper end and a lower angle adjuster which is connected to the lower end. This results in a four-way lumbar support in which the curvature and height of the crown of the curvature can be adjusted.

In an advantageous embodiment, the support device is clamped in the angle adjuster at the upper end and/or at the lower end so that it cannot rotate. In this way it is ensured that a change in the upper and/or lower angle of inclination causes a change in the curvature of the support device so that the position of the crown of the curvature is adjusted.

The support device features a lordosis mat which is equipped with a large number of articulated mat elements. The support device may thus take on a shape that is particularly well adapted to the spine so that the lordosis is optimally supported.

In order to be able to adapt the shape of the support device to the spine, the mat elements advantageously have an extension axis which is essentially parallel to the back plane.

The actuator enables a comfortable adjustment of the position of the crown of the curvature and can be advantageously designed as a shape memory actuator. Shape memory actuators have the advantage, among other things, that they are comparatively light, quiet and energy-saving. Shape memory actuators are particularly suitable for use with the lumbar support as they exert great forces on the only small adjustment travels.

In an advantageous embodiment, the actuator can be fitted with a movable bearing which is connected to the connecting portion. The clamping member preferably has a bolt which is attached to the movable bearing in order to transmit a displacement of the movable bearing to the clamping member.

Advantageously, the lumbar support includes a locking device for locking the angle adjuster. The angle adjuster can then be locked when the crown of the curvature is in the desired position. In this way, the angle adjuster always remains in its setting, even when the actuator is not energized.

In an advantageous embodiment, the locking device may comprise a wrap spring and a wrap spring drive, wherein the wrap spring drive is configured to transfer the wrap spring from a relaxed state, in which the wrap spring locks the angle adjuster, to a tensioned state, in which the wrap spring releases the angle adjuster.

In an advantageous embodiment, the lumbar support comprises a mounting plate on which the angle adjuster is mounted by the bearing element. This results in a functional and practical connection between the angle adjuster and the seat.

The seat according to the invention is in particular a motor vehicle seat which has the lumbar support.

Figure 2:
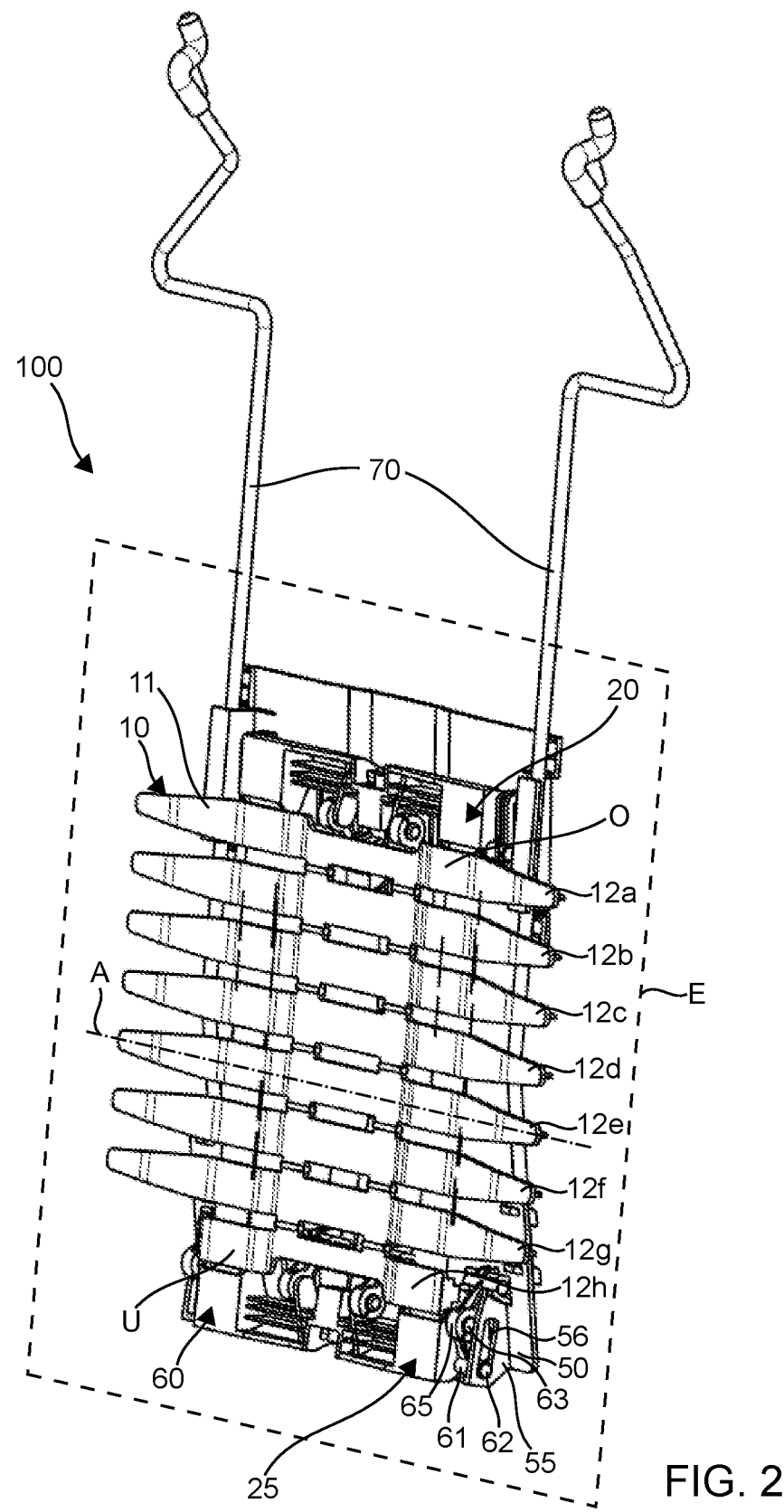
Figure 3C:
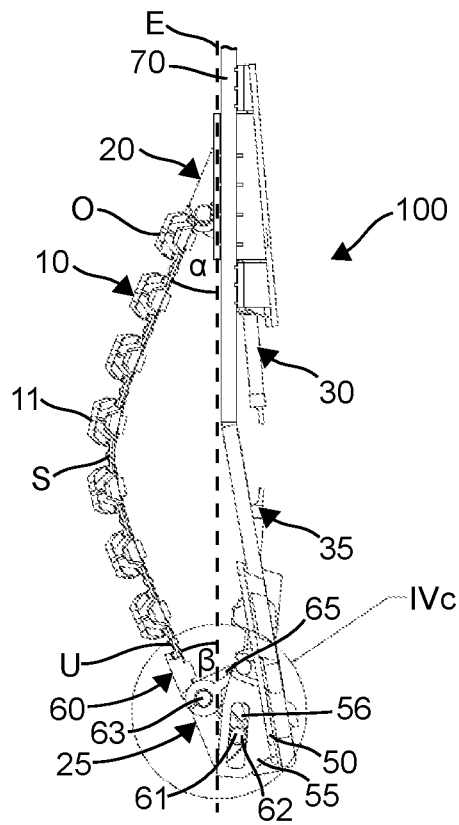
Figure 3D:
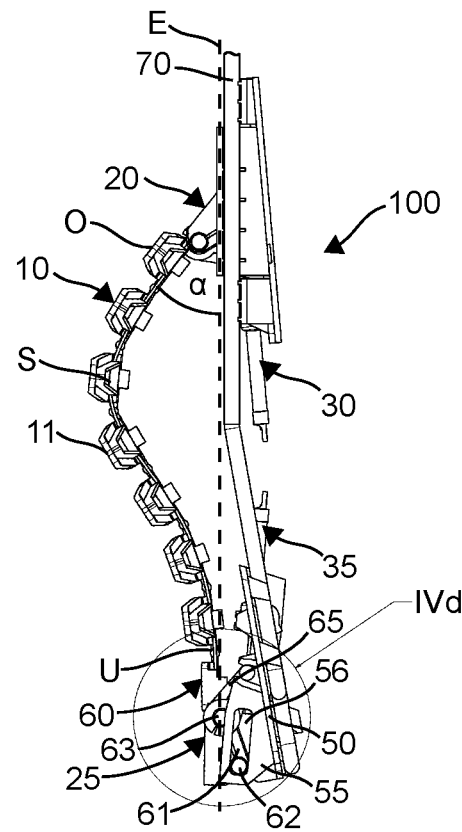
Figure 4C:
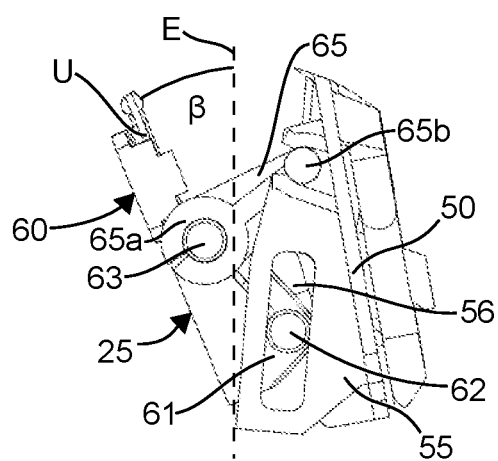
Figure 4D:
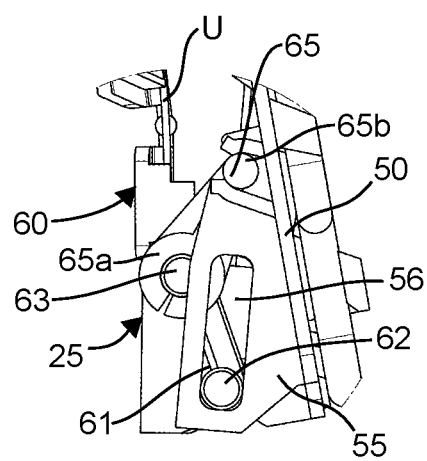
Figure 5:
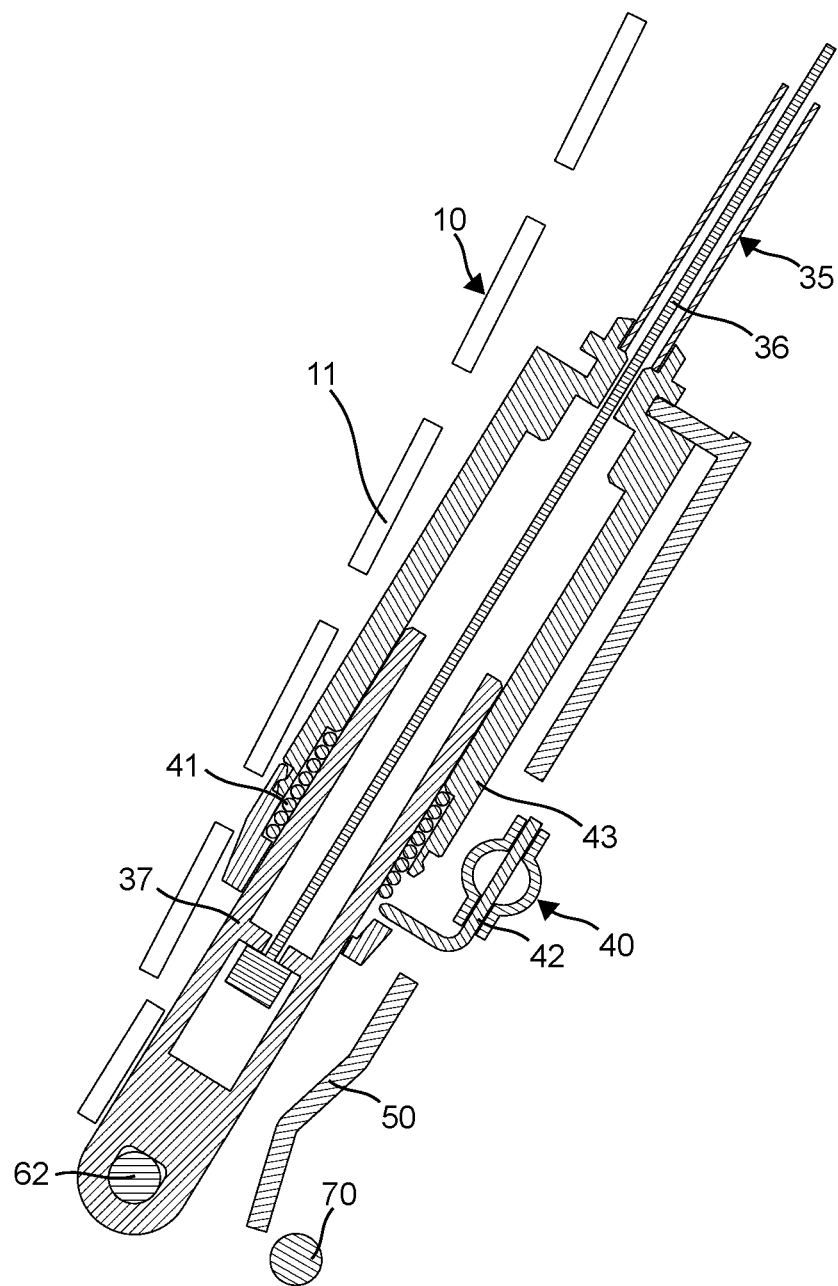

In the following, the invention is described with reference to schematic drawings on the basis of exemplary embodiments. In the drawings shows:

FIG. 1 a perspective view of a vehicle seat;

FIG. 2 a perspective view of a first e exemplary embodiment of the lumbar support according to the invention;

FIG. 3a a lateral view of a second exemplary embodiment of the lumbar support according to the invention, in which the upper angle of inclination and the lower angle of inclination are minimised;

FIG. 3b a lateral view of the exemplary embodiment according to FIG. 3a, in which the lower angle of inclination is maximised;

FIG. 3c a lateral view of the exemplary embodiment according to FIG. 3a, in which the lower angle of inclination and the upper angle of inclination are increased;

FIG. 3d a lateral view of the exemplary embodiment according to FIG. 3a, where the upper angle of inclination is maximised;

FIG. 4a an enlarged view of the lower angle adjuster according to detail IVa in FIG. 3a;

FIG. 4 b an enlarged view of the lower angle adjuster according to detail IVb in FIG. 3b;

FIG. 4c an enlarged view of the lower angle adjuster according to detail IVc in FIG. 3c;

FIG. 4d an enlarged view of the lower angle adjuster according to detail IVd in FIG. 3d and FIG. 5 a cross section through a locking device.

FIG. 1 shows a seat 200 as it is installed in a motor vehicle. The seat 200 has a backrest 201 and a seat surface 202 and defines a back plane E. A lumbar support not shown in FIG. 1 is installed in the backrest 201 and supports the lordosis in the area of the lumbar spine.

A lumbar support 100 for the seat 200 is clearly shown in FIG. 2. The lumbar support 100 comprises a support device 10, an upper angle adjuster 20 and a lower angle adjuster 25. The support device 10 has an upper end O and a lower end U. The upper angle adjuster 20 is connected to the upper end O. The lower angle adjuster 25 is connected to the lower end U. It is advisable to clamp the support device 10 at the upper end O in a rotationally fixed manner in the upper angle adjuster 20 and at the lower end U in a rotationally fixed manner in the lower angle adjuster 25.

The support device 10 also has a lordosis mat 11. The lordosis mat 11 is provided with a multitude of mat elements 12a, 12b, 12c, 12d, 12e, 12f, 12g, 12h, which are hinged together each having an axis of extension A, which is illustrated for the mat element 12e only as an example. The axis of extension A is essentially parallel to the plane of the back E.

As FIGS. 3a to 3d clearly show, the upper end O of the support device 10 includes an upper angle of inclination α with the back plane E. The lower end U of the support device 10 includes a lower angle of inclination β with the back plane E. The support device 10 forms an crown of the curvature S, which is in an adjustable position between the upper end O and the lower end U. The angle adjusters 20, 25 are used to change the upper angle of inclination α or the lower angle of inclination β in order to adjust the position of the crown of the curvature S.

The crown of the curvature S is the apex of the support device 10. The crown of the curvature S is thus the point of the support device 10 which has the greatest distance to the back plane E. As clearly illustrated in FIG. 1, the position of the crown of the curvature S has a longitudinal component $S_L$ with respect to the back plane E in a direction perpendicular to the back plane E and a height component $S_H$ with respect to a reference plane B passing through the seat 202 and perpendicular to the back plane E. When changing the upper angle of inclination α and/or the lower angle of inclination β, the shape of the support device 10 is changed so that the position of the crown of the curvature S in the height component $S_H$ and/or in the longitudinal component $S_L$ is adjusted. The shape of the support device 10 can thus be adjusted so that it can support the lordosis well.

The lumbar support 100 shown here is a four-way lumbar support 100 in which the curvature of the support device 10 and the height of the crown of the curvature S can be adjusted. The curvature of the support device 10 results indirectly from the longitudinal component $S_L$ of the position of the crown of the curvature S, because the greater the distance of the crown of the curvature S from the back plane E in the longitudinal direction, the stronger the curvature of the support device 10 becomes. The height of the crown of the curvature S results from the height component $S_H$ of the position of the crown of the curvature S. With other embodiments, it is possible to connect either only the upper end O or only the lower end U with an angle adjuster 20, 25. In this case one refers to a two-way lumbar support.

The lumbar support 100 has actuators 30, 35 which are each designed as shape memory actuators. The actuator 30 allows the angle adjuster 20 to be adjusted to change the upper angle of inclination α. Similarly, the angle adjuster 25 can be adjusted by the actuator 35 to change the lower angle of inclination β. The actuators 30, 35 make the adjustment of the angle of inclination α, β considerably easier. Shape memory actuators in particular are extremely quiet and can be operated with low power consumption. They are also particularly suitable for use with the lumbar support 100, as the angle adjusters 20, 25 only require short adjustment paths, in which shape memory actuators exert great forces.

As FIG. 5 clearly shows, the lumbar support 100 has a locking device 40 for locking the lower angle adjuster 25. In addition, the lumbar support 100 may have an additional locking device to lock the upper angle adjuster 20. By means of the locking device 40, the actuator 35 can be de-energized when the desired position of the crown of the curvature S is reached. The crown of the curvature S then remains in its position because the angle adjuster 20 is locked. Thus, a nearly consumption-free continuous operation of the lumbar support 100 is possible.

As FIG. 5 further shows, the actuator 35 has a drive train 36 which is non-positively connected to a movable bearing 37. The movable bearing 37 is slidably attached to the actuator 35 in the direction of the drive train 36. The movable bearing 37 is moved towards the drive train 36 by a tensile force acting on the drive train 36.

The locking device 40 has a wrap spring 41, which is accommodated in a wrap spring receptacle 43, and a wrap spring drive 42. The wrap spring 41 surrounds the movable bearing 37. The wrap spring drive 42 transfers the wrap spring 41 from a relaxed state to a tensioned state. In the relaxed state, the wrap spring 41 rests directly on the movable bearing 37. As a result, a friction force acts between the wrap spring 41 and the movable bearing 37, so that the wrap spring 41 locks the movable bearing 37 and thus the angle adjuster 25. In the tensioned state, the wrap spring 41 releases the movable bearing 37 and the angle adjuster 25.

Furthermore, the lumbar support 100 comprises a mounting plate 50, a bearing element 55, a clamping member 60 and a coupling 65. The angle adjuster 25 is mounted on the mounting plate 50 by means of the bearing element 55. The support device 10 is clamped in the clamping member 60. Holding wires 70 are guided to the mounting plate 50. The clamping member 60 has a connecting portion 61, which is mounted on the bearing element 55 so that it can be rotated and slided, and a coupling point 63. For this purpose, an oblong hole-shaped recess 56 is provided on the bearing element 55. The connecting portion 61 comprises a cylindrical bolt 62 which engages in the recess 56 and is connected to the movable bearing 37 of the actuator 35. The bolt 62 can be moved along the recess 56 and rotated in it. The coupling 65 has a first end 65a and a second end 65b and is rigid. The first end 65a is rotatably connected to the clamping member 60 at the coupling point 63. The second end 65b is rotatably connected to the bearing element 55.

In order to adjust the position of the crown of the curvature S, the actuator 35 causes a movement of the bolt 62 in the recess 56. The clamping member 60 is then moved in a translatory way along the recess. Due to the connection with the rigid coupling 65, an additional rotational movement of the clamping member 60 around the bolt 62 occurs. The clamping member 60, in which the lower end U of the support device 10 is clamped in a rotationally fixed manner, is inclined relative to the back plane E by the rotational movement, so that the lower angle of inclination β is changed.

FIGS. 3a to 3d and 4a to 4d clearly illustrate the lumbar support 100 at different angles of inclination α, β and the corresponding positions of the angle adjusters 20, 25. In addition, it is evident how the combination of the positions of the angle adjusters 20, 25 results in different forms of the support device 10 and thus, as a consequence, different positions of the crown of the curvature S.

The lumbar support 100 can thus be continuously adjusted according to the exemplary embodiments described here. Due to the different positions of the crown of the curvature S, different curvatures of the supporting device 10 and heights of the crown of the curvature S are achieved. The actuator travel required here is significantly shorter than with conventional lumbar supports. When using shape memory actuators, an extremely low-noise and energy-saving implementation can also be achieved.

| List of reference signs | |
|---|---|
| 10 | support device |
| 11 | lordosis mat |
| 12a | mat element |
| 12b | mat element |
| 12c | mat element |
| 12d | mat element |
| 12e | mat element |
| 12f | mat element |
| 12g | mat element |
| 12h | mat element |
| 20 | angle adjuster |
| 25 | angle adjuster |
| 30 | actuator |
| 35 | actuator |
| 36 | drive train |
| 37 | movable bearing |
| 40 | locking device |
| 41 | wrap spring |
| 42 | wrap spring drive |
| 43 | wrap spring receptacle |
| 50 | fixing plate |
| 55 | bearing element |
| 56 | recess |
| 60 | clamping member |
| 61 | connecting portion |
| 62 | bolt |
| 63 | coupling point |
| 65 | coupling |
| 65a | first end |
| 65b | second end |
| 70 | holding wire |
| 100 | lumbar support |
| 200 | seat |
| 201 | backrest |
| 202 | seat surface |
| A | extension axis |
| B | reference plan |
| E | back plane |
| O | upper end |
| S | crown of the curvature |
| $S_H$ | height component |
| $S_L$ | longitudinal component |
| U | lower end |
| α | upper angle of inclination |
| β | lower angle of inclination |

The invention claimed is:

1. A lumbar support for a seat defining a back plane, the lumbar support comprising:
a support device having an upper end defining an upper angle of inclination (α) with the back plane and a lower end defining a lower angle of inclination (β) with the back plane and forming a crown of a curvature located in an adjustable position between the upper end and the lower end;
at least one angle adjuster connected to one of the upper end and the lower end of the support device and adapted to vary at least one of the upper angle of inclination (α) and the lower angle of inclination (β) to adjust the position of the crown of the curvature, and
an actuator for adjusting the at least one angle adjuster;
wherein the at least one angle adjuster is connected to the actuator such that a movement generated by the actuator causes a translational and rotational adjustment of the at least one angle adjuster to change at least one of the upper angle of inclination (α) and the lower angle of inclination (β); and
a bearing element for the at least one angle adjuster and a coupling having a first end and a second end, the at least one angle adjuster having a clamping member, the clamping member having a connecting portion and a coupling point, the connecting portion being rotatably and slidably mounted on the bearing element, wherein the first end of the coupling is rotatably connected to the clamping member at the coupling point and the second end of the coupling is rotatably connected to the bearing member, and wherein the actuator engages the connecting portion to cause movement of the clamping member relative to the bearing member to change the at least one of the upper inclination angle ($\alpha$) and the lower inclination angle ($\beta$).

2. The lumbar support according to claim 1, wherein the at least one angle adjuster is an upper angle adjuster connected to the upper end and further comprising a lower angle adjuster connected to the lower end.

3. The lumbar support according to claim 1, wherein the support device is non-rotatably clamped in the at least one angle adjuster.

4. The lumbar support according to claim 1, wherein the support device includes a lordosis mat having a plurality of mat elements which are connected to one another in an articulated manner.

5. The lumbar support according to claim 4, wherein each of the plurality of mat elements has an extension axis which extends substantially parallel to the back plane.

6. The lumbar support according to claim 1, wherein the actuator is a shape memory actuator.

7. The lumbar support according to claim 1, wherein the actuator includes a slidably mounted movable bearing connected to the connecting portion of the clamping member.

8. The lumbar support according to claim 7, wherein the clamping member includes a bolt fixed to the movable bearing for transmitting a displacement of the movable bearing to the clamping member.

9. The lumbar support according to claim 1, further comprising a locking device for locking the at least one angle adjuster.

10. The lumbar support according to claim 9, wherein the locking device has a wrap spring and a wrap spring drive, the wrap spring drive configured to transfer the wrap spring from a relaxed state, in which the wrap spring locks the at least one angle adjuster, to a tensioned state, in which the wrap spring releases the at least one angle adjuster.

11. The lumbar support according to claim 1, further comprising a fastening plate on which the at least one angle adjuster is mounted by the bearing element.

12. A motor vehicle seat having the lumbar support according to claim 1.

* * * * *